(12) United States Patent
Bhargava et al.

(10) Patent No.: US 10,467,114 B2
(45) Date of Patent: Nov. 5, 2019

(54) HIERARCHICAL DATA PROCESSOR TESTER

(71) Applicant: INTERNATIONAL BUSINESS MACHINES CORPORATION, Armonk, NY (US)

(72) Inventors: Neil S. Bhargava, Austin, TX (US); Freddys M. Espinoza, Austin, TX (US); Stefan A. Gert Van Der Stockt, Gauteng (ZA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/210,666

(22) Filed: Jul. 14, 2016

(65) Prior Publication Data

US 2018/0018248 A1   Jan. 18, 2018

(51) Int. Cl.
*G06F 11/00* (2006.01)
*G06F 11/263* (2006.01)
*G06F 11/22* (2006.01)
*G06F 11/30* (2006.01)

(52) U.S. Cl.
CPC ........ *G06F 11/263* (2013.01); *G06F 11/2236* (2013.01); *G06F 11/2268* (2013.01); *G06F 11/3006* (2013.01); *G06F 11/3024* (2013.01)

(58) Field of Classification Search
CPC ............ G06F 11/2268; G06F 11/3006; G06F 11/3024; G06F 11/3672; G06F 11/3688; G06F 11/263; G06F 11/2236
See application file for complete search history.

(56) References Cited

U.S. PATENT DOCUMENTS

| | | | |
|---|---|---|---|
| 5,408,410 | A | 4/1995 | Kaji |
| 6,871,298 | B1 * | 3/2005 | Cavanaugh ........... G06F 11/263 712/227 |
| 6,996,518 | B2 | 2/2006 | Jones et al. |
| 7,209,875 | B2 | 4/2007 | Quirk et al. |
| 7,587,307 | B2 | 9/2009 | Cancedda et al. |
| 7,711,545 | B2 | 5/2010 | Koehn |

(Continued)

OTHER PUBLICATIONS

Anonymously; "Cognitive Computing Based Smart Prior Art Search"; http://ip.com/IPCOM/000243453D; Sep. 22, 2015.

(Continued)

*Primary Examiner* — Charles Ehne
(74) *Attorney, Agent, or Firm* — Conley Rose, P.C.

(57) ABSTRACT

A hierarchical data processor test system (and method) is usable to configure a hierarchical plurality of similarity operators and process predetermined input test data through a data processor under test (DPUT) to produce corresponding DPUT output data. The test system is further usable to process the DPUT output data and the predetermined output test data through at least some of the plurality of similarity operators in hierarchical order, determine a highest order similarity operator that indicates a match between the DPUT output data and the predetermined output test data, and compute a confidence score based on the highest order similarity operator that indicated the match. Based on the confidence score exceeding a threshold, the test system also may include activating the DPUT for use by non-test data.

20 Claims, 7 Drawing Sheets

(56) References Cited

U.S. PATENT DOCUMENTS

| | | | |
|---|---|---|---|
| 2005/0055217 A1 | 3/2005 | Sumita et al. | |
| 2006/0290365 A1* | 12/2006 | Riedlinger | G01R 31/2856 |
| | | | 324/750.03 |
| 2008/0154577 A1 | 6/2008 | Kim et al. | |
| 2009/0157386 A1 | 6/2009 | Zhou | |
| 2010/0169621 A1* | 7/2010 | Takao | G06F 11/2236 |
| | | | 712/227 |
| 2010/0235683 A1* | 9/2010 | Gala | G06F 11/2236 |
| | | | 714/32 |
| 2011/0194738 A1 | 8/2011 | Choi et al. | |
| 2011/0302472 A1* | 12/2011 | Van Eikema Hommes | |
| | | | G06F 11/2236 |
| | | | 714/742 |
| 2012/0054756 A1* | 3/2012 | Arnold | G06F 9/4881 |
| | | | 718/102 |
| 2014/0149800 A1* | 5/2014 | Nishimaki | G06F 11/263 |
| | | | 714/40 |
| 2015/0046875 A1 | 2/2015 | Xu et al. | |
| 2016/0364308 A1* | 12/2016 | Shanbhogue | G06F 11/2635 |
| 2017/0161180 A1* | 6/2017 | Raghavan | G06F 11/3684 |

OTHER PUBLICATIONS

Sengamedu et al.; "Method and System for Confidence Scoring for Extraction Quality"; http://ip.com/IPCOM/000195339D; Apr. 30, 2010.

Anonymously; "A System & Method for Determining Similarity between Spatio-Temporal Behavior of Users"; http://ip.com/IPCOM/000245212D; Feb. 18, 2016.

Anonymously; "Computer Aided Innovation"; http://ip.com/IPCOM/000244576D; Dec. 23, 2015.

* cited by examiner

| Rec. # | Pred'd input | Pred'd output | Actual output | SO1 | SO2 | SO3 | SO4 | Conf. score |
|---|---|---|---|---|---|---|---|---|
| 1 | | | | Y | – | – | – | 1 |
| 2 | | | | N | Y | – | – | 0.75 |
| 3 | | | | Y | – | – | – | 1 |
| 4 | | | | N | N | Y | – | 0.5 |
| 5 | | | | N | N | N | N | 0 |
| ... | | | | | | | | |
| M | | | | | | | | |

FIG. 3

HIERARCHICAL DATA PROCESSOR TESTER

STATEMENT REGARDING FEDERALLY SPONSORED RESEARCH OR DEVELOPMENT

N/A.

STATEMENT REGARDING PRIOR DISCLOSURES BY THE INVENTOR OR A JOINT INVENTOR

N/A.

BACKGROUND

The present disclosure relates to automated testing of the accuracy of data processing units (e.g., computer-implemented language translators), and more specifically, to the use of a hierarchical set of similarity operators arranged in order from most deterministic to most probabilistic.

Cognitive computing systems generally involve the simulation of human thought processes in a computerized model. For example, a cognitive computing system may include self-learning systems that use data mining, pattern recognition, and natural language processing to mimic the way the human brain works. Cognitive computing systems are generally subjected to testing to determine their general accuracy. For example, a language translator may be tested to determine the general accuracy of its translated output. Humans may be involved in determining the accuracy of such systems.

SUMMARY

According to an embodiment, a computer-implemented method includes various operations which may be performed, for example, by a computing resource. The method may include configuring a hierarchical plurality of similarity operators and processing predetermined input test data through a data processor under test (DPUT) to produce corresponding DPUT output data. The method further may include processing the DPUT output data and the predetermined output test data through at least some of the plurality of similarity operators in hierarchical order, determining a highest order similarity operator that indicates a match between the DPUT output data and the predetermined output test data, and computing a confidence score based on the highest order similarity operator that indicated the match. Based on the confidence score exceeding a threshold, the method also may include activating the DPUT for use by non-test data.

In another embodiment, a system includes one or more processors configured to implement a data processor test system that implements a hierarchical set of similarity operators to test a data processor. The data processor test system may be configured to process a plurality of records through a DPUT, in which each record contains predetermined input test data and predetermined output test data. For each record, the data processor test system may be configured to process actual output data from the DPUT based on the predetermined input test data from each record and the predetermined output test data through at least one of the plurality of similarity operators until a similarity operator indicates a match between the predetermined output test data and the actual output data from the DPUT. For each record, the data processor test system may be configured to compute a confidence score based on an order of the similarity operator that indicated the match and, based on the confidence scores, activate the DPUT for use by non-test data.

In yet another embodiment, a computer program product for testing a data processor comprises a computer readable storage medium having program instructions embodied therewith. The program instructions are executable by a processing resource and, when executed, cause the processing resource to specify an order for a plurality of similarity operators in a set of similarity operators. The instructions further cause the processing resource to process predetermined input test data through a data processor under test (DPUT) to produce corresponding DPUT actual test output data. The instructions also cause the processing resource to process the DPUT actual test output data and the predetermined output test data in the set of similarity operators in the specified order until one of the similarity operators indicates a match between the DPUT actual test output data and the predetermined output test data. The instructions cause the processing resource to determine a highest order similarity operator that indicates a match between the DPUT output data and the predetermined output test data and to compute a confidence score based on the determined highest order.

BRIEF DESCRIPTION OF THE DRAWINGS

FIG. 3 illustrates input and output data as well as confidence scores in accordance with various embodiments;

DETAILED DESCRIPTION

Figure 1:
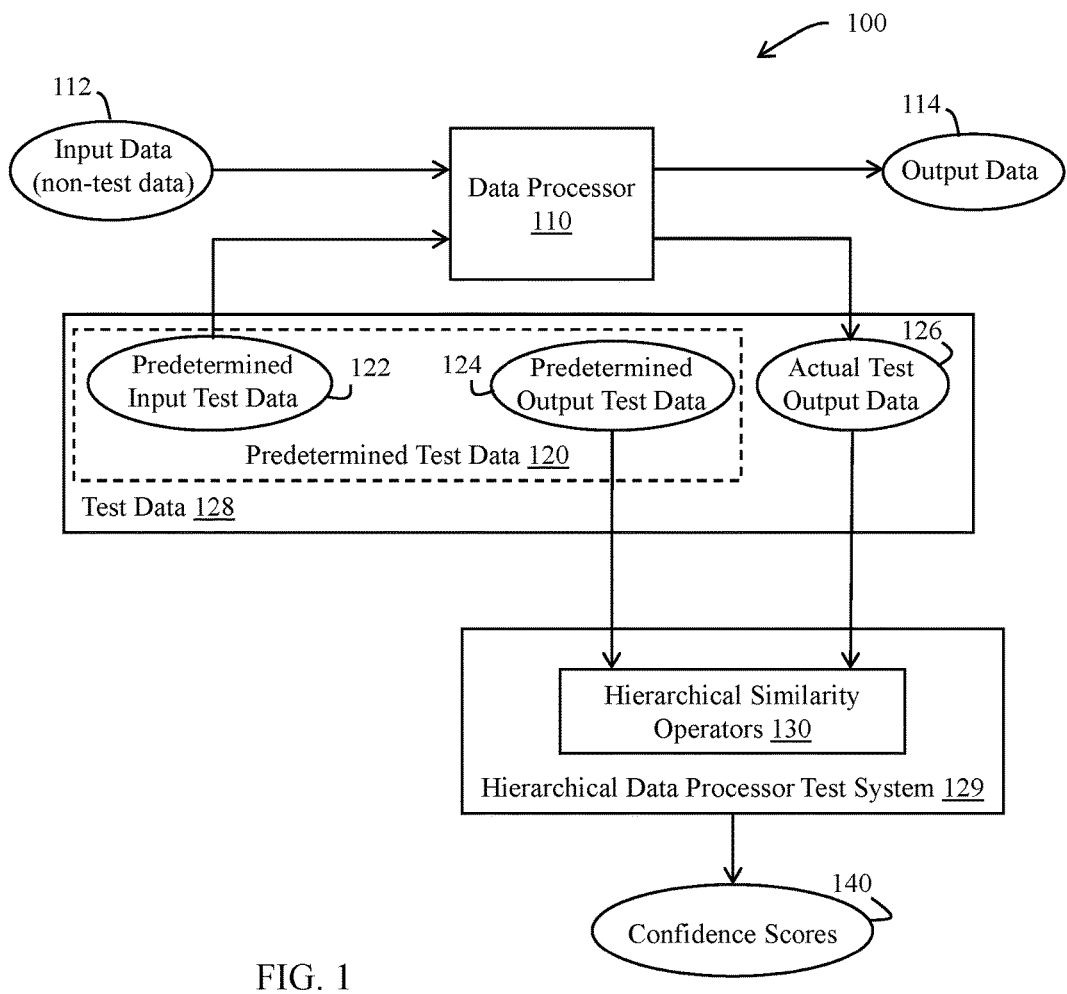
FIG. 1 shows a system in accordance with various embodiments.

As noted above, systems such as cognitive systems may be tested to determine how accurately they perform. Manual testing of such systems by humans is an accurate way to test such systems, but can be labor-intensive and costly. Computers can be configured (e.g., by way of software applications) to automatically test cognitive systems, but such computer-aided testing may produce false negatives. For example, if the cognitive system is a language translator, a predetermined test input phrase may be translated by the translator from one language into another. The issue for the testing system is to determine how accurate the translation was, which itself is not an easy task for a computer. The translated phrase from the translator may be compared on a character-by-character basis to a known good translation for the input test phrase, but as a phrase may be translated from a first language in multiple different ways into a second language, it may be difficult for an exact match similarity test to accurately verify all translations. The testing system may return a "miss" if the translated output phrase does not exactly match (character for character) the known good translation. The translated output phrase may actually be a correct translation, but the testing system reports it as an incorrect translation—a "miss."

In accordance with the disclosed embodiments, a hierarchical data processor test system may be employed to test the accuracy of a data processor. The data processor being tested can be any type of cognitive system such as a language translator, a pattern recognition system, and the like. For ease of explanation, the following description may refer to a language translator for translating a word, phrase, sentence, paragraph, etc. from a first language (e.g., English) to a second language (e.g., Spanish), but in general the data processor can perform other types of data processing besides language translation. The data processor being tested is referred to herein as the data processor under test (DPUT).

The hierarchical data processor test system may employ multiple similarity operators. A similarity operator compares the output generated by the DPUT from a predetermined test input value to a known good test output value. Any of a variety of similarity operators may be implemented. In general, the similarity operators are specific to the particular data processing performed by the DPUT. For example, if the DPUT is a language translator, the similarity operators may include a lexical comparison operator such as a minimum edit distance similarity operator, an N-gram comparisons similarity operator, a cosine similarity operator, a Levenshtein distance similarity operator, a Dice's coefficient similarity operator, a block distance similarity operator, and a Euclidean distance similarity operator. The similarity operators may include a semantic comparison similarity operator such as dictionary look-ups, rule-based look-ups, Regex matching, etc.

Some similarity operators may be highly deterministic. For example, in a similarity operator that performs an exact match, a character string comparison will pronounce a translated output from the DPUT to be correct as long as it matches on a character-by-character basis a known good translation for the test input value (word, sentence, etc.). Other similarity operators may be probabilistic in that they may compute a similarity score that encodes a degree of similarity for how closely the translated output is to the known good translation. One similarity operator may pronounce a match to exist between the DPUT output and the known good output value despite there being a larger difference between the two outputs as compared to another similarity operator. That is, among the probabilistic-based similarity operators, some similarity operators are more "liberal" than others in determining matches. A more liberal similarity operator is more likely to identify a match between to values than a less liberal similarity operator, but also is more likely to result in more false positive outcomes.

The reference to "hierarchical" means that the testing system uses multiple similarity operators that are applied during testing in an order from most deterministic to most probabilistic (i.e., most liberal). A user of the testing system may configure the hierarchy of similarity operators in order from what the user determines to be most deterministic to most probabilistic. The most deterministic similarity operator (e.g., a character-by-character exact match operator) will indicate a match if the translated output from the DPUT exactly matches the known good translation. In some embodiments, multiple records are processed through the DPUT and the results are analyzed by the hierarchical data processor test system. If the highest level similarity operator (e.g., the most deterministic similarity operator) determines that the DPUT correctly translated the test input value, then that record is not further processed by the other similarity operators. However, if the exact match similarity operator determines that the DPUT did not correctly translate the test input value (which could be a false negative), then the translated output is processed through the next similarity operator in the hierarchy. If the next such similarity operator determines that the DPUT correctly translated the test input value, then that record is not further processed by the remaining similarity operators, but if this second similarity operator determines that the DPUT did not correctly translate the test input value (which again could be a false negative), then the translated output is processed through the next similarity operator in the hierarchy, and so on. Thus, the number of input records to each successive similarity operator in the hierarchy is a decreasing set of records as each similarity operator determines one or more output values from the DPUT to correctly match a known good output and the record is then removed from further consideration.

The hierarchical data processor test system may compute a confidence score for each record (i.e., each test input value to be translated) based on which similarity operator level in the hierarchy resulted in a translation "hit." In some embodiments, if a higher level similarity operator (i.e., a similarity operator towards the more deterministic end of the scale) indicates a translation hit, the confidence score may be computed as a higher value indicating a higher confidence that the DPUT accurately translated the test input value. A decision can be made, for example, as to whether to activate the data processor based on a statistical analysis of the confidence scores computed for the various translated test input values.

With reference now to FIG. 1, an embodiment of a system 100 is shown comprising a data processor 110 and a hierarchical data processor test system 129 configured to test the data processor 110. The data processor 110 may implement a language translation function or other type of data processing function such as cognitive functions. In general, input data 112 is provided to the data processor 110. The data processor 110 processes the input data 112 and generates corresponding output data 114. The data processor 110 may be implemented as machine instructions (software) executing on a computer such as a desktop computer, notebook computer, smart phone, or any other type of computing device. In some embodiments, the data processor 110 is implemented as a service available through a public network such as the Internet. Users of the service can upload their input data 112 to the service through the public network and receive the output data 114 via the public network as well. The user may interact with the service implementing the data processor 110 via a web browser executing on their computing device.

Before (but could be after) creating and releasing the data processor 110 for use by the users, an entity such as the entity that created or is hosting the data processor may cause the data processor 110 to be tested as described herein. FIG. 1 illustrates that, in addition to the normal input-output flow via input data 112 and output data 114, a testing process may be performed on the data processor 110 using predetermined test data 120. The predetermined test data 120 may include predetermined input test data 122 and predetermined output test data 124. The reference to "predetermined" indicates that the test data is determined apriori, that is, before the testing process begins. In the example of the data processor 110 implementing a language translation function, the predetermined input test data 122 may comprise words, phrases, sentences, etc. in a source language, and the predetermined output test data 124 includes translations in a target language of the predetermined input test data 122. The predetermined output test data 124 are known acceptably accurate translations of the corresponding predetermined input test data 122. For example, the data processor 110 may translate English into Spanish. The predetermined input test data 122 may include the English phrase "I have a house" and the predetermined output test data may include "Yo tengo una casa" as being a correct translation of the English language input phrase.

During testing of the data processor 110 (also referred to herein as the data processor under test (DPUT)), the predetermined input test data 122 is provided to the data processor 110. The output from the data processor is shown in FIG. 1 as the actual test output data 126. Right or wrong, the actual test output data 126 includes the translations determined by the data processor 110 of the predetermined input test data 122. The collection of predetermined input test data 122, predetermined output test data 124, and the actual test output data 126 from the data processor 110 is referred to as "test data" 128.

The data processing test system 129 implements, includes, or otherwise has access to a hierarchical set of similarity operators 130. The hierarchical set of similarity operators 130 receive both the predetermined output test data 124 comprising the known good translations of the predetermined input test data 122 and the actual test output data 126. Each of the hierarchical similarity operators 130 can determine whether a given actual test data output 126 matches the predetermined output test data 124 for a given predetermined input test data 122. As noted above, some similarity operators may be highly deterministic and only indicate a match if there is a match between the actual test data output 126 and the predetermined output test data 124 on a character-by-character basis. Other similarity operators may indicate a match exists even if there is not an exact match of the two character strings. For example, "yo tengo una casa" may be deemed to match "tengo una casa" (both of which are acceptable translations for "I have a house") even though the two character strings do not match exactly. A confidence score 140 can be computed for each actual test output data determined to successfully match a corresponding predetermined output test data 124 (e.g., a successful translation). The confidence score provides a value indicative of how likely the actual test output data is to actually be correct or be a false positive.

Figure 2:
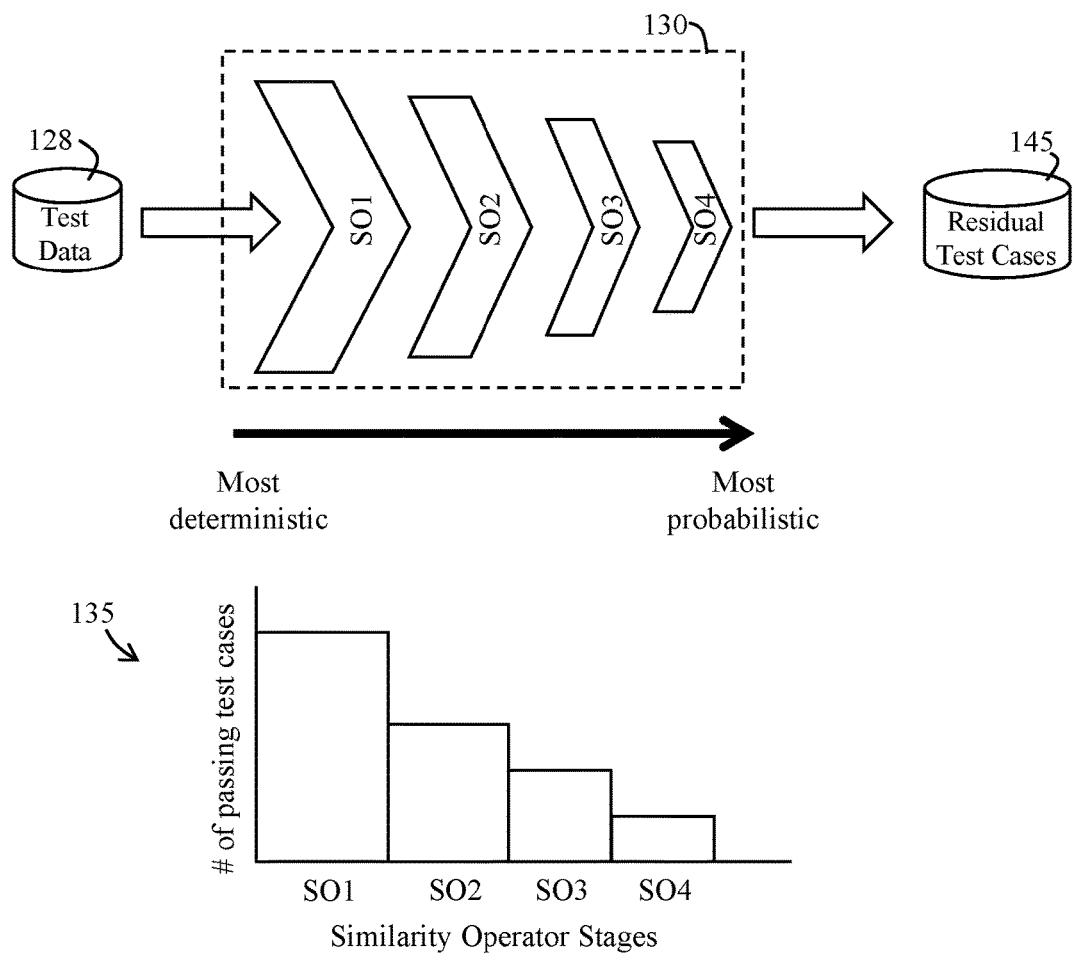
FIG. 2 illustrates the operation of the hierarchical set of similarity operators in accordance with various embodiments.

With reference now to FIG. 2, an example of the operation of the test system is shown in accordance with various embodiments. In this example, the hierarchical similarity operators 130 include four similarity operators designated as SO1, SO2, SO3, and SO4. Although four similarity operators are depicted in this embodiment, a different number of similarity operators (e.g., two or more) may be included in other embodiments. In the context of testing a language translator, the SO1 similarity operator may be implemented as a Java '==' operator which checks for an exact character string comparison (character by character). The SO2 similarity operator may a Levenshtein Edit Distance similarity operator. The SO3 similarity operator may be the term frequency-inverse document frequency operator. The SO4 similarity operator may be the n-gram set matching similarity operator. The hierarchy of similarity operators SO1-SO4 may be preconfigured by a user of the testing system.

As noted above, the test data set 128 includes one or more predetermined input test data 122 and corresponding predetermined output test data 124. The test data 128 may be arranged as one or more records. In the context of a language translator, each record may include an input word, phrase, etc. and one or more corresponding acceptable translations for the input. Because there may be multiple acceptable translations for any given word, phrase, etc., the predetermined output test data in each record may comprise multiple acceptable translations for each predetermined input test data.

Each record from the test data 128 is fed into the hierarchical similarity operators 130 starting with the most deterministic similarity operator SO1. For each record, the similarity operator SO1 is activated to compare each DPUT actual test output data to the predetermined output test data to determine if the DPUT actual output is a match to the predetermined output test data. If the DPUT actual test output data from a record is deemed to match the predetermined output test data, then that record is removed from further analysis by the testing system. Those records, however, that are not deemed by SO1 to have been translated correctly (which could be correct or may be a false negative) are then processed through the next similarity operator in the hierarchy (SO2). Those records which SO2 deems not to have been translated correctly (which again could be a false negative) are then processed through the next similarity operator (SO3) in the hierarchy, and so on through SO4 in this example. Those records that are not deemed to have been translated correctly by any of the similarity operators SO1-SO4 are included in a residual test cases data store 145.

FIG. 2 illustrates a resulting histogram 135 for the similarity operators. The histogram specifies the number of records that are deemed by each similarity operator to result in a match between the DPUT actual test output data and the predetermined output test data. In this example, the number of record hits detected by each similarity operator in the hierarchy decreases from SO1 to SO4. This example indicates that the most deterministic similarity operator SO1 identified correct translations more than the other similarity operators. Ideally, a DPUT 110 would result in the most deterministic similarity operator SO1 successfully identifying all test input data as having been correctly translated, and thus no records would have had to be processed through the other similarity operators. The confidence level would then be high that that particular DPUT is highly accurate. However, in many cases, the most deterministic similarity operator SO1 may not be able to confirm that each and every test input data value is correctly translated by the DPUT.

FIG. 3 shows an example of the results of the processing of the test data 128 by the hierarchical data processor test system. The data shown in the example of FIG. 3 may be stored in one data structure (e.g., a table) or in separate data structures. The data shown includes multiple (e.g., M) records 150 (record numbers 1, 2, 3, . . . , M). Each record includes the predetermined input test data 122, the predetermined output test data 124, the actual test output data 126, pass/fail indicators 158, 160, 162, and 164 from the various similarity operators, and the confidence score 140.

As explained above, if a given similarity operator deems a particular actual test output data value to be correct (as indicated by a "Y" mark in FIG. 3 for that particular similarity operator), then that record is removed from further analysis by a similarity operator at a lower level in the hierarchy. In the example of FIG. 3, SO1 deemed the predetermined input test data 122 of record number 1 to have been correctly translated, and thus the record is not further analyzed by SO2-SO4 as indicated by the dash marks. For record number 2, however, SO 1 could not confirm that the translation of record 2's predetermined input test data 122 was translated correctly, but SO2 did confirm the translation.

In some embodiments, each successive similarity operator in the hierarchy is more forgiving meaning that it does not require an exact character string match to determine a translation is correct, but also carries an increased risk of a false positive. The hierarchical data processor test system computes a confidence score 140 for each record. In some examples, the confidence score is a function of where in the hierarchy of similarity operators a correct translation was determined. In general, if SO1 is an exact match similarity operator, an indication from SO1 that a predetermined input test data 122 was successfully translated can be considered to be highly accurate as a comparison to known good translations is performed by SO1. At the other end of the spectrum, SO4 may be the most probabilistic similarity operator and thus is much more susceptible to a false positive than SO1. As such, the confidence score should be higher for a hit determined by SO1 versus a high determined by SO4. In one embodiment, the confidence score is computed as:

$$C(r) = 1 - \left[\frac{P-1}{L}\right]$$

where r refers to the record number, P refers to hierarchy level at which a hit was determined and L is the number of similarity operators. With reference to FIG. 3, r is an integer ranging from 1 to M. As there are four similarity operators SO1-SO4 in this example, L is 4. P corresponds to the similarity operator that reports a successful (Y) translation. For example, for records 1 and 3, P is 1 because SO1 indicated a successful translation. Accordingly the confidence score for records 1 and 3 is 1−[(1−1)/4] which equals 1. For record 2, P is 2 because the second similarity operator (SO2) in the hierarchy indicated a successful translation. The confidence score for record 2 is 1−[(2−1)/4] which equals 0.74. For record 4, P is 3 and accordingly the confidence score is calculated as 0.5. For record 5, none of the similarity operators found the predetermined input test data 122 to be correctly translated and the confidence score is forced to a predetermined low value (e.g., 0).

Figure 4:
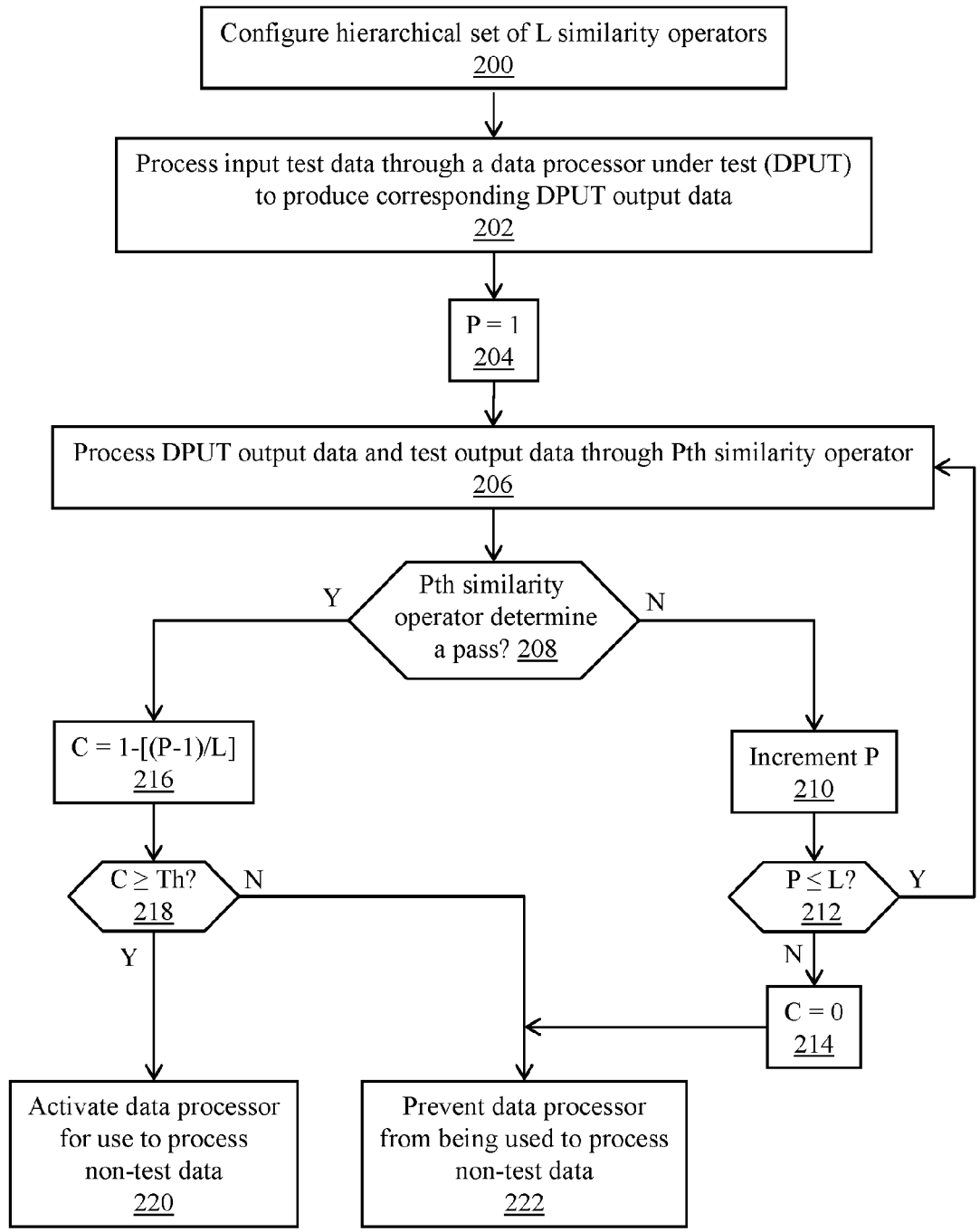
FIG. 4 shows an embodiment of a method for implementing the data processor test system.

FIG. 4 illustrates an embodiment of the operation of the hierarchical data processor test system. The operations may be performed in the order shown or in a different order. Further, while the operations may be performed sequentially, two or more of the operations may be performed concurrently. The operations may be performed by a computing device executing test software.

At 200, the method includes configuring a hierarchical set of L similarity operators. The example of FIG. 1 includes 4 similarity operators and thus L is 4 for that example. However, other examples may include a different number of similarity operators thus L can be varied accordingly. A user may configure the set of L similarity operators through, for example, a graphical user interface executing on the user's computing device (desktop computer, smart phone, notebook computer, tablet computer, etc.). In some examples, a drop-down menu may be displayed by which the user can select from a list of predetermined similarity of operators. The list of potential similarity operators may be displayed alternatively in the form of a check box list in which the user clicks on the buttons associated with the desired operators. In accordance with the disclosed embodiments, the user selects the similarity operators in the order desired to form the hierarchy, but in other embodiments, the test system may order the selected similarity operators into a hierarchical order based on a predetermined deterministic/probabilistic rating for each such operator. The test system may include, or have access to, machine instructions which can implement each selected similarity operator.

At 202, the method includes processing the predetermined input test data through a DPUT to produce corresponding DPUT output data (i.e., the actual test output data 126 explained above). This operation may include the processing of a single predetermined input test data value through the DPUT and not multiple predetermined input test data values. For example, the DPUT may be requested to translate only a single sentence.

At 204, the variable P is initialized to 1. P will be used to compute the confidence score as explained above. At 206, the method includes processing the DPUT actual output data and the predetermined output test data through the Pth similarity operator. At this stage, as P=1, the first simulator operator in the hierarchy (SO1) will be used to process the DPUT actual output data and the predetermined output test data. The machine instructions that implement the SO1 may be executed to perform operation 206.

At 208, the method determines whether the Pth similarity operator determines whether the DPUT generated accurate output data relative to the predetermined output test data. If the Pth similarity operator does not indicate that the DPUT correctly processed the predetermined test input data, then control flows to operation 210 at which P is incremented by 1. The new value of P is compared to L, which is the total number of similarity operators selected by the user to be included in the hierarchy of similarity operators. If P is less than or equal to L, then it is known that not all of the similarity operators have been invoked and control loops back to operation 206 where the process is repeated but this time with the next similarity operator in the hierarchy.

At 208, if the Pth similarity operator indicates that the DPUT correctly processed the predetermined input test data (e.g., a correct translation), then control flows to operation 216 at which the confidence score C is computed. The confidence score may be computed as shown and explained above (C=1−[(P−1)/L]).

The user also may have configured a confidence score threshold (Th) before starting the test. The confidence score threshold may indicate the minimum acceptable confidence score, that is, a confidence score below the threshold indicates a general failure of the accuracy of the DPUT. At 218, the method includes comparing the confidence score computed at 216 with the preconfigured threshold. If the computed confidence score is equal to or greater than the threshold, then the data processor 110 may be activated at 220 for use to process non-test data. Activating the data processor may include providing updating a domain name for the service implementing the data processor, updating a record in a domain name service (DNS) to map the domain name to the internet protocol (IP) address associated with the service, copy the service on to a server with accessibility to a public network, etc. If, however, the computed confidence score is less than the threshold, then the data processor 110 may be prevented at 222 from being used to process non-test data. This operation may involve doing nothing, that is, not doing the affirmative actions listed above for operation 220. In other embodiments, operation 222 may include deleting or updating a DNS record to preclude access to the service containing the DPUT, removing the DPUT from a server, etc.

If, at 212, no similarity operator deems the predetermined test input data to have been correctly processed by the DPUT and P has been incremented to a value that exceeds L, then it is known that all of the similarity operators in the hierarchy have been tested (and failed) and the confidence score is set to a minimal value (e.g., zero at 214), which is at least less than the threshold Th. Control then continues at 222 as described above.

Figure 5:
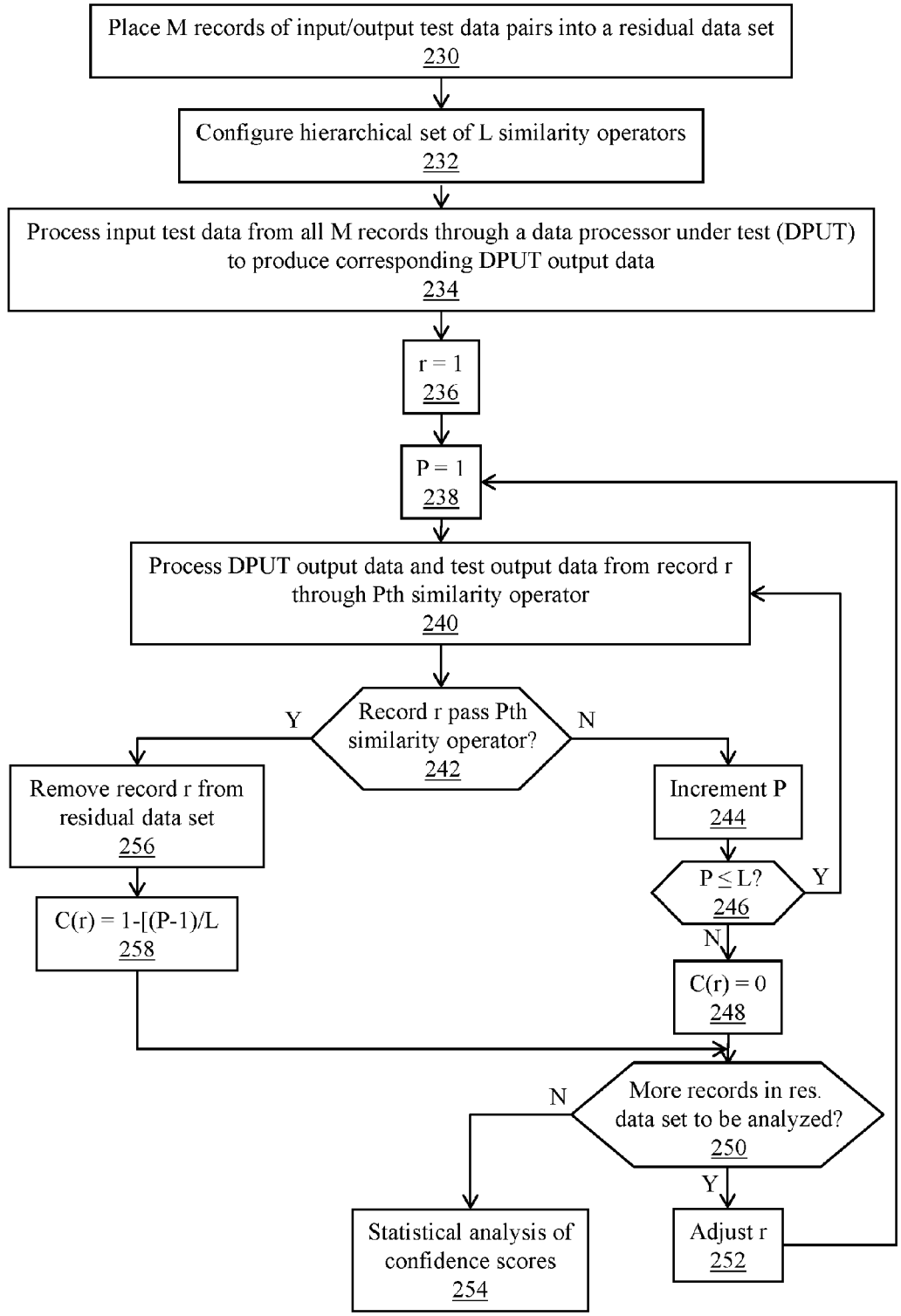
FIG. 5 shows another embodiment of a method for implementing the data processor test system.

FIG. 5 illustrates an alternative embodiment for testing a DPUT in which multiple test case records are processed through the DPUT and the hierarchical set of similarity operators. The operations may be performed in the order shown or in a different order. Further, while the operations may be performed sequentially, two or more of the operations may be performed concurrently. The operations may be performed by a computing device executing test software.

At 230, the method includes placing M records of input/output test data pairs into a residual data set. In this embodiment, all records are initially in the residual data set unless determined to have been processed correctly by the DPUT and thus removed from the residual data set. M in this example can be any number 1 or greater. For example, M may be 100. As such, 100 test records may be provided to the DPUT during the testing process. The process of placing the records into the residual data set may involve the user executing the test program to select a test data set from a list of test data sets, each test data set predetermined to be suitable for testing specific types of data processors.

At 232, the method includes configuring a hierarchical set of L similarity operators. This operation may be implemented as described above. At 234, the method then processes all of the M records—one at a time—through the DPUT 110 to produce corresponding DPUT output data (predetermined output test data 124). The DPUT output data may be stored with each record as in the example of FIG. 3 or stored separately from the predetermined input and output test data. In this example, all of the DPUT output data is generated from all M records before any of the output data is analyzed by the similarity operators.

At 236, a variable r is initialized to a value of 1. The r variable is used to track which record is being analyzed. In this example, the analysis of the records starts with the first record and thus r is set to 1. At 238, P also is initialized to 1 as explained previously. A loop, similar to that described above regarding FIG. 4, is performed for record r and the hierarchical set of similarity operators. At 240, the method includes processing the DPUT output data and the predetermined output test data from record r through the Pth similarity operator. At 242, the process determines whether record r successfully passed the Pth similarity operator.

If record r did not pass the Pth similarity operator (e.g., translation not deemed to be correct), the control flows to operation 244 at which P is incremented. If P is equal to or less than L 246, control loops back to operation 240 at which the same DPUT output data and the predetermined output test data from record r are provided to the next similarity operator in the hierarchy.

If, at 242, the similarity operator outputs a result that the DPUT output data successfully matches the predetermined output test data, that is within the range of similarity permitted by that similarity operator, then control flows to 256 at which record r is removed from the residual data set. A confidence score is then computed for record r as shown at 258 and described above.

After a confidence score is computed at 258 (as a result of a similarity operator identifying a successful match) or at 248 (none of the similarity operators found a match to exist), control then flows to 250 in which a determination is made as to whether any more records exist in the residual data set to be analyzed by the hierarchical set of similarity operators. If another record exists to be analyzed, then r is adjusted at 252 to point to the next record in the residual data set to be tested. The next record may not necessarily be the next record from the initial M records because some of the records may have previously been removed from the residual data set as being deemed a match by one of the similarity operators. Control then loops back to 238 at which P is reset to 1 and the process then repeats with the new record.

Once all of the records are analyzed through the hierarchical set of similarity operators, the confidence scores computed for the M records can be statistically analyzed at 254. Any suitable form of statistical analysis is acceptable. In one example, an average and standard deviation may be computed for the set of confidence scores. Other forms of statistical analysis can be employed as well to produce an overall assessment of how well the DPUT performed for processing the M records of test data. As before, the DPUT can be transitioned into an operational state based on the statistical analysis indicating sufficient accuracy for the DPUT, or precluded from being made operational if the statistical analysis determines the DPUT not to be sufficiently accurate.

Figure 6:
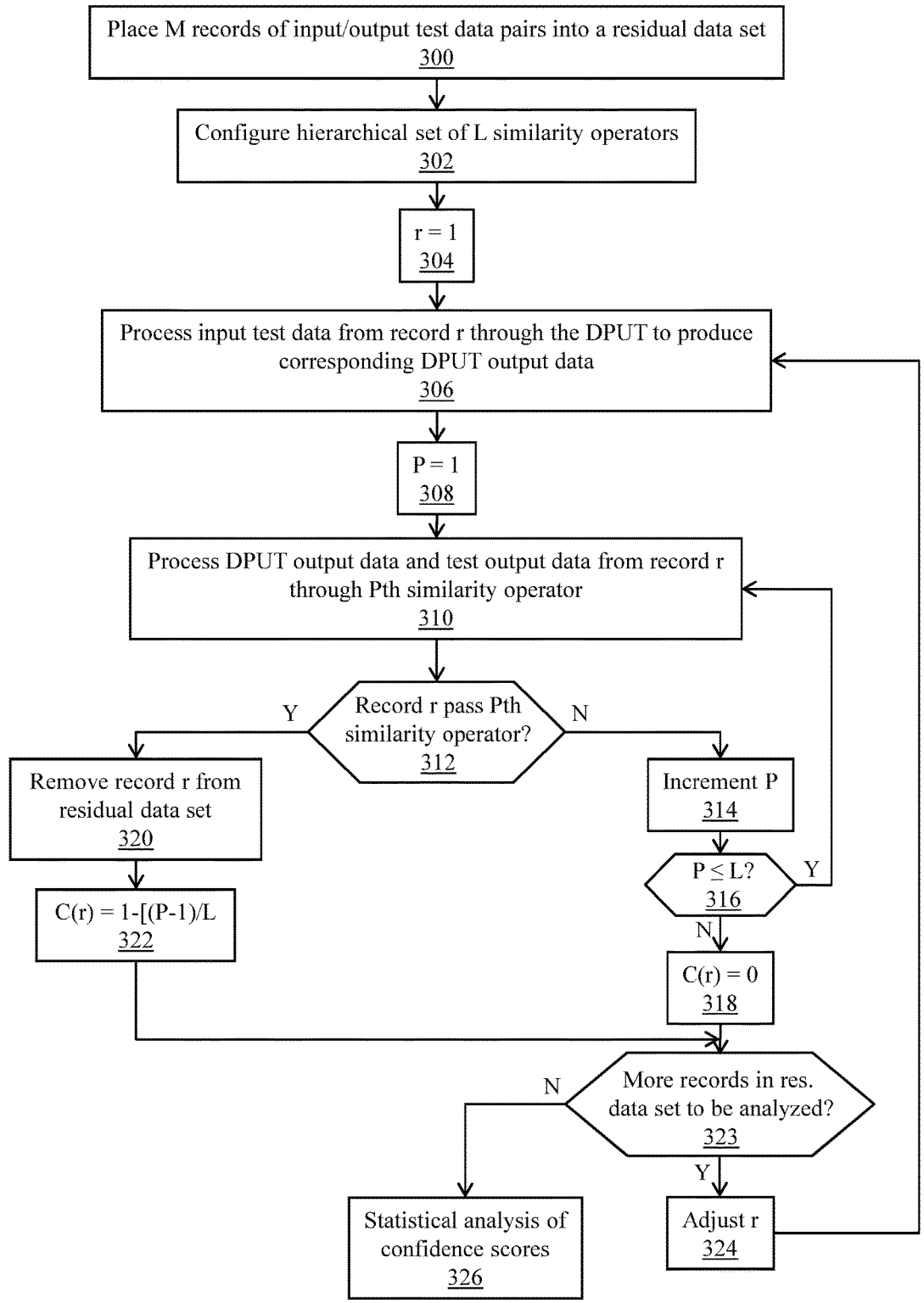
FIG. 6 shows yet another embodiment of a method for implementing the data processor test system.

FIG. 6 is an example of another embodiment. The embodiment of FIG. 6 is similar to that of FIG. 5. A difference is that each record in the embodiment of FIG. 6 is fully analyzed before proceeding to the next record. That is, for a given record, the predetermined input test data is run through the DPUT, the DPUT output is processed by the hierarchical set of similarity operators, and confidence score is computed before moving on to the next record. The operations may be performed in the order shown in FIG. 6 or in a different order. Further, while the operations may be performed sequentially, two or more of the operations may be performed concurrently. The operations may be performed by a computing device executing test software.

At 300, the method includes placing M records of input/output test data pairs into a residual data set. As described above, all records are initially in the residual data set unless determined to have been processed correctly by the DPUT and thus removed from the residual data set. M in this example can be any number 1 or greater. The process of placing the records into the residual data set may involve the user executing the test program to select a test data set from a list of test data sets, each test data set predetermined to be suitable for testing specific types of data processors.

At 302, the method includes configuring a hierarchical set of L similarity operators. This operation may be implemented as described above.

At 304, a record variable r is initialized to a value of 1 and the predetermined input test data associated record r is processed at 306 through the DPUT to produce DPUT output data. At 308, P is initialized to 1 as explained previously. A loop, similar to that described above regarding FIGS. 4 and 5, is performed for record r and the hierarchical set of similarity operators. At 310, the method includes processing the DPUT output data and the predetermined output test data from record r through the Pth similarity operator. At 312, the process determines whether record r successfully passed the Pth similarity operator.

If record r did not pass the Pth similarity operator (e.g., translation not deemed to be correct), the control flows to operation 314 at which P is incremented. If P is equal to or less than L 316, control loops back to operation 310 at which the same DPUT output data and the predetermined output test data from record r are provided to the next similarity operator in the hierarchy as explained previously. If, at 312, the similarity operator indicates that the DPUT output data successfully matches the predetermined output test data, then control flows to 320 at which record r is removed from the residual data set. A confidence score is then computed for record r as shown at 322 and described above.

As before, after a confidence score is computed at 322 or 318, control then flows to 323 in which a determination is made as to whether any more records exist in the residual data set to be analyzed by the hierarchical set of similarity operators. If another record exists to be analyzed, then r is adjusted at 324 to point to the next record in the residual data set to be tested. As explained above, the next record may not necessarily be the next record from the initial M records because some of the records may have previously been removed from the residual data set as being deemed a match by one of the similarity operators. Control then loops back to 306 at which P is reset to 1 and the process then repeats with the new record.

Once all of the records are analyzed through the hierarchical set of similarity operators, then at 326, the confidence scores computed for the M records can be statistically analyzed. Any suitable form of statistical analysis is acceptable. In one example, an average and standard deviation may be computed for the set of confidence scores. Other forms of statistical analysis can be employed as well to produce an overall assessment of how well the DPUT performed for processing the M records of test data. As before, the DPUT can be transitioned into an operational state based on the statistical analysis indicating sufficient accuracy for the DPUT.

Figure 7:
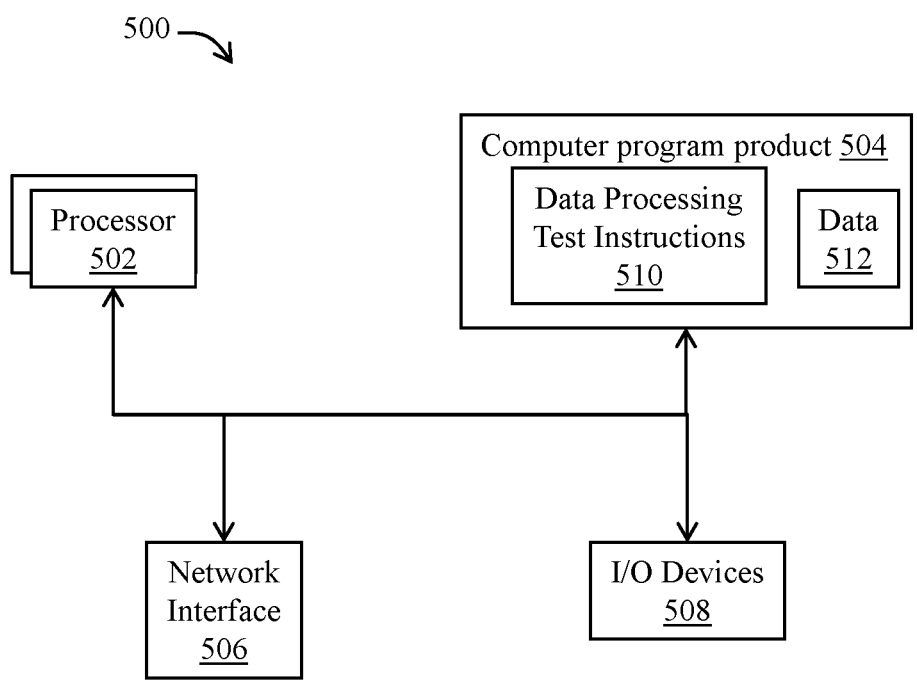
FIG. 7 illustrates a computing device for implementing the data processor test system in accordance with various embodiments.

FIG. 7 is a block diagram of a computing device 500 suitable to implement the hierarchical test system described herein. The computing device includes one or more processors 502, a computer program product 504, a network interface 506, and one or more input/output devices 508. The network interface 506 may be wired, wireless, or a combination of both. The input/output (I/O) devices may include a display, a keyboard, and a pointing device such as a mouse or trackball. The computing device 500 may be a server computer, a desktop computer, a notebook computer, a tablet device, or other types of computing devices. The computing device 500 may be implemented as a single computer or multiple computers networked together.

The computer program product 504 may comprise a computer-readable medium implemented, for example, as a non-transitory storage such as a volatile storage device (e.g., random access memory) or non-volatile storage (e.g., magnetic disk drive, solid state storage drive, etc.). The computer-readable medium may be used to store data processing test instructions 510 which, when executed by a processing resource (e.g., the processor(s) 502), perform some or all of the operations described herein. The data processing test instructions also may implement the various similarity operators in the hierarchical set of similarity operators. The computer-readable medium 504 also includes data 512 which may be the test data or any and all of the predetermined test input data 122, the predetermined output test data 124, and the actual test output data 126 from the DPUT.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or eternal storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    configuring, by a computing resource, a hierarchical plurality of similarity operators;
    processing, by the computing resource, predetermined input test data through a data processor under test (DPUT) to produce corresponding DPUT actual test output data;
    processing, by the computing resource, the DPUT actual test output data and predetermined output test data through at least some of the hierarchical plurality of similarity operators in hierarchical order;
    determining, by the computing resource, a highest order similarity operator that indicates a match between the DPUT actual test output data and the predetermined output test data;
    computing a confidence score based on the highest order similarity operator that indicated the match; and
    based on the confidence score exceeding a threshold, causing the DPUT to be activated for use by non-test data.

2. The computer-implemented method of claim 1, further comprising, based on the confidence score not exceeding a threshold, precluding the DPUT for use by non-test data.

3. The computer-implemented method of claim 1, wherein processing the predetermined input test data through the DPUT comprises processing a plurality of predetermined input test data through the DPUT to produce DPUT actual test output data corresponding to each predetermined input test data.

4. The computer-implemented method of claim 3, wherein processing the DPUT actual test output data and the predetermined output test data through at least some of the hierarchical plurality of similarity operators and determining the highest order similarity operator that indicates a match between the DPUT actual test output data and the predetermined output test data includes
    providing only that predetermined input test data to each similarity operator in the hierarchical plurality of similarity operators that did not result in a match from a higher order similarity operator.

5. The computer-implemented method of claim 3, wherein computing the confidence score comprises computing a confidence score for each for each DPUT actual test output data.

6. The computer-implemented method of claim 4, further comprising statistically analyzing the confidence score.

7. The computer-implemented method of claim 1, wherein the DPUT is a language translation data operator, the predetermined input test data is a character string in a first language, and the predetermined output test data is a character string in a second language, and wherein the hierarchical plurality of similarity operators comprises similarity operators that determine how close the DPUT actual test output data to the character string in the second language.

8. The computer-implemented method of claim 7, wherein the hierarchical plurality of similarity operators comprise at least one of: a minimum edit distance similarity operator, an N-gram comparisons similarity operator, a cosine similarity operator, a Levenshtein distance similarity operator, a Dice's coefficient similarity operator, a block distance similarity operator, a Euclidean distance similarity operator, and a semantic comparison similarity operator.

9. A system comprising:
    one or more processors configured to implement a data processor test system that implements a hierarchical set of similarity operators to test a data processor;
    wherein the data processor test system is configured to:

process a plurality of records through a data processor under test (DPUT), each record containing predetermined input test data and predetermined output test data;

for each record, process actual output data from the DPUT based on the predetermined input test data from each record and the predetermined output test data through at least one of a plurality of similarity operators in the hierarchical set of similarity operators until a similarity operator indicates a match between the predetermined output test data and the actual output data from the DPUT;

for each record, compute a confidence score based on an order of the similarity operator that indicated the match;

based on the confidence scores, activate the DPUT for use by non-test data.

10. The system of claim 9, wherein the data processor test system is configured to: compute a statistical analysis of the confidence score for each record; and activate the DPUT for use by non-test data based on the statistical analysis.

11. The system of claim 9, wherein the DPUT is a language translation data operator, the predetermined input test data is a character string in a first language, and the predetermined output test data is a character string in a second language, and wherein the plurality of similarity operators determine how close the actual output data is to the character string in the second language.

12. The system of claim 9, wherein the data processor test system implements a user interface by which the hierarchical set of similarity operators are specified.

13. The system of claim 9, wherein the data processor test system computes the confidence score based on the order of the similarity operator that indicated the match and a number of similarity operators in the hierarchical set of similarity operators.

14. The system of claim 9, wherein the data processor test system is configured to assign a confidence score as a predetermined minimum value to a record for which none of the similarity operators indicates a match.

15. The system of claim 9, wherein the data processor test system is configured to compute a confidence score for each record before processing another record through the DPUT.

16. The system of claim 9, wherein the data processor test system is configured to process all of the records through the DPUT before processing any of the actual output data from the DPUT through any of the similarity operators.

17. A computer program product for testing a data processor, the computer program product comprising a computer readable storage medium having program instructions embodied therewith, the program instructions executable by a processing resource to cause the processing resource to:

specify an order for a plurality of similarity operators in a set of similarity operators;

process predetermined input test data through a data processor under test (DPUT) to produce corresponding DPUT actual test output data;

process the DPUT actual test output data and a predetermined output test data in the set of similarity operators in the specified order until one of the similarity operators indicates a match between the DPUT actual test output data and the predetermined output test data;

determine a highest order similarity operator that indicates a match between the DPUT actual test output data and the predetermined output test data; and compute a confidence score based on the determined highest order.

18. The computer program product of claim 17, wherein the program instructions cause the processing resource to compare the confidence score to a threshold and cause the DPUT to be placed into operation for use in processing non-test input data.

19. The computer program product of claim 17, wherein the program instructions cause the processing resource to: process a plurality of predetermined input test data through the DPUT to produce the DPUT actual test output data corresponding to each predetermined input test data; and compute a confidence score for each DPUT actual output data.

20. The computer program product of claim 17, wherein the DPUT is a language translator.

* * * * *